US012754431B2

(12) United States Patent
Marconcini

(10) Patent No.: US 12,754,431 B2
(45) Date of Patent: Oct. 6, 2026

(54) METHODS AND SYSTEMS FOR CONTROLLING MEDIA CONTENT PRESENTATION ON A SMART GLASSES DISPLAY

(71) Applicant: Adeia Guides Inc., San Jose, CA (US)

(72) Inventor: Stefano Marconcini, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 4 days.

(21) Appl. No.: 18/944,527

(22) Filed: Nov. 12, 2024

(65) Prior Publication Data

US 2025/0067986 A1 Feb. 27, 2025

Related U.S. Application Data

(63) Continuation of application No. 18/225,233, filed on Jul. 24, 2023, now Pat. No. 12,169,279, which is a (Continued)

(51) Int. Cl.
*G02B 27/01* (2006.01)
*G02B 27/00* (2006.01)
*G06F 3/16* (2006.01)

(52) U.S. Cl.
CPC ..... *G02B 27/0172* (2013.01); *G02B 27/0093* (2013.01); *G02B 27/0101* (2013.01); *G02B 27/0179* (2013.01); *G06F 3/167* (2013.01); *G02B 2027/014* (2013.01); *G02B 2027/0178* (2013.01); *G02B 2027/0187* (2013.01)

(58) Field of Classification Search
CPC ........ H04M 1/72457; G09G 2360/144; G09G 2320/0626; G09G 2320/0633; G09G 2320/064; G09G 2320/0646; G09G 2320/066; G09G 2320/0233; G06F 3/167; G02B 2027/0187; G02B 2027/0178;
(Continued)

(56) References Cited

U.S. PATENT DOCUMENTS 8,752,963 B2 6/2014 Mcculloch et al.
8,775,069 B1 7/2014 Kabel et al.
(Continued)

FOREIGN PATENT DOCUMENTS

WO 2019176577 A1 9/2019

OTHER PUBLICATIONS

U.S. Appl. No. 17/140,781, filed Jan. 4, 2021, Stefano Marconcini.
(Continued)

*Primary Examiner* — Mihir K Rayan
(74) *Attorney, Agent, or Firm* — HG LAW LLP

(57) ABSTRACT

Systems and methods are described herein for controlling a smart glass display based on environmental conditions. The smart glass display may be configured for presenting a media asset. Further, the smart glass display is configured with a transparent display function that adjusts the presentation of the media asset based on the environmental conditions. The smart glass display may identify environmental information and determine a hazard based on the environmental information. Further, a smart glass display may observe the user's eye movement and may execute a specific function corresponding to the user's eye movement.

20 Claims, 6 Drawing Sheets

Related U.S. Application Data continuation of application No. 17/140,781, filed on Jan. 4, 2021, now Pat. No. 11,747,622.

(58) Field of Classification Search
CPC .......... G02B 2027/014; G02B 27/0179; G02B 27/0172; G02B 27/0101; G02B 27/0093
See application file for complete search history.

(56) References Cited

U.S. PATENT DOCUMENTS

| | | | | |
|---|---|---|---|---|
| 9,074,899 | B2 * | 7/2015 | Yang | G01C 21/206 |
| 10,061,509 | B2 | 8/2018 | Mese et al. | |
| 10,096,149 | B2 | 10/2018 | Belogolovy | |
| 11,069,104 | B1 | 7/2021 | Kuang et al. | |
| 11,747,622 | B2 | 9/2023 | Marconcini | |
| 2002/0044152 | A1 * | 4/2002 | Abbott, III | G06T 19/006 345/629 |
| 2009/0278766 | A1 * | 11/2009 | Sako | G06T 11/60 345/592 |
| 2013/0113973 | A1 | 5/2013 | Miao | |
| 2013/0265261 | A1 | 10/2013 | Min | |
| 2013/0314433 | A1 | 11/2013 | Ko | |
| 2014/0043211 | A1 | 2/2014 | Park | |
| 2016/0034042 | A1 | 2/2016 | Joo | |
| 2016/0048021 | A1 | 2/2016 | Border | |
| 2016/0178905 | A1 | 6/2016 | Rider et al. | |
| 2016/0306173 | A1 | 10/2016 | Tsukahara et al. | |
| 2018/0088323 | A1 * | 3/2018 | Bao | G02B 27/017 |
| 2019/0156535 | A1 * | 5/2019 | DeLuca | G06F 3/013 |
| 2019/0294261 | A1 | 9/2019 | Lohse et al. | |
| 2020/0166781 | A1 | 5/2020 | Trim et al. | |
| 2020/0397371 | A1 * | 12/2020 | Klosinski, Jr. | G01N 21/33 |
| 2021/0020141 | A1 | 1/2021 | Yuasa et al. | |
| 2021/0304502 | A1 | 9/2021 | Chaurasia et al. | |
| 2022/0214546 | A1 | 7/2022 | Marconcini | |
| 2022/0214547 | A1 | 7/2022 | Marconcini | |
| 2023/0367126 | A1 | 11/2023 | Marconcini | |
| 2023/0367127 | A1 | 11/2023 | Marconcini | |

OTHER PUBLICATIONS

U.S. Appl. No. 18/225,233, filed Jul. 24, 2023, Stefano Marconcini.
U.S. Appl. No. 18/225,237, filed Jul. 24, 2023, Stefano Marconcini.

* cited by examiner

METHODS AND SYSTEMS FOR CONTROLLING MEDIA CONTENT PRESENTATION ON A SMART GLASSES DISPLAY

CROSS-REFERENCE TO RELATED APPLICATIONS

This application is a continuation of U.S. patent application Ser. No. 18/225,233, filed Jul. 24, 2023, which is a continuation of U.S. patent application Ser. No. 17/140,781, filed Jan. 4, 2021, now U.S. Pat. No. 11,747,622. This disclosures of which application are hereby incorporated by reference herein in their entireties.

BACKGROUND

This disclosure relates to controlling presentation of a media asset on a smart glasses display, and more particularly, to methods and systems for determining environmental surroundings of the smart glasses display and adjusting the presentation of the media asset to the smart glasses display, and systems and methods for displaying a media asset to a user in relative motion on a smart glasses display, based on environmental information detected near the smart glasses display.

SUMMARY

Advancements in media technology have led to the development of augmented smart glass systems with wireless connectivity and imaging into the frames of eyewear lenses. Glass systems exist with full extended reality (XR) technologies, which are tailored to virtual reality (VR), augmented reality (AR) and mixed reality (MR) technologies; however, these introduce many challenges and are very limiting as to where they may be utilized. VR systems may fully immerse (e.g., giving the user a sense of being in an environment) or partially immerse (e.g., giving the user a sense of looking at an environment) users in a three-dimensional, computer-generated environment. The environment may include objects or items that the user can interact with. AR systems may provide a modified version of reality, such as enhanced information overlaid over real-world objects. MR systems map interactive virtual objects to the real world. Such systems may utilize wearables, such as a head-mounted device, comprising a stereoscopic display or smart glasses where the display uses most of the lens. Smart glasses may utilize a heads-up display that partially covers the viewing path of the lens.

The smart glass systems with a heads-up display introduce many challenges. For example, such a smart glass system is very limited in the information that it may provide. In some cases, the only information that is presented on these displays is vital information provided by one or more sensors contacting the user. In another example, the smart glass system cannot provide content for the user's entertainment. One use for these smart glasses is while on a walk or a run. However, in such a function, the displays only present general information. On the other hand, runners running indoors while using a treadmill often have a display for entertainment. When considering augmented reality, headsets are generally used indoors and position the user in a safe location and do not allow them to go for a walk outdoors and interact with the outdoors. Additionally, XR systems may not detect when a user alters their field of view or focus in the XR environment, since the wearable device being used to view the environment may not include an external device (e.g., lens). As another example, although pupil dilation and constriction may vary depending on what a user is viewing in an XR environment or an amount of light entering the eye of the user, a user does not have control over his or her pupil, and thus monitoring the user's pupil may not be a reliable way to determine a gaze or field of view of the user within an XR environment. Even if a user's field of view is accurately ascertained, if there is a direct light shining in the user's field of view, it may be difficult for the user to view the display. For example, while walking along a path, a user may be distracted or not see a hazard (e.g., walking near an edge of a cliff, an intersection, a busy highway). On the other hand, a user may miss a part of the media asset being presented, or conversely, the user may miss a safety hazard while the media asset is playing. To require user inputs to turn on and off the display anytime the user may need to pause the presentation because of a hazard may be cumbersome and make the display less effective in providing entertainment while on a walk.

To overcome these problems, systems and methods are provided herein for controlling the presentation of a media asset on a smart glass display based on a field of view of a user, information about light projecting onto the smart glass display, and environmental information. Systems and methods described herein also determine the existence of a potentially hazardous situation involving the user and adjust the presentation of the media asset based on the existence of the potentially hazardous situations. Further, the systems and methods measure the information about light projecting onto the smart glass display and may adjust the presentation of the media asset on the display by increasing or decreasing the opacity, or enhance and change color mix and/or luminosity of the media asset presented.

In some embodiments, the systems and methods provide an sensor to sense a gaze shift of a user to a new portion of a lens, and execute an action to pause the presentation of the media asset. Systems and methods described herein also generate on a smart glass display a media asset while adjusting the environment opacity, or enhance and change color mix and/or luminosity based on indicators in a vicinity of the smart glasses display. For example, a portion of the smart glass display includes measuring light, or enhance and change color mix and/or luminosity observing safety hazards, and varying conditions of the display, based on such sensors, specifically, identified hazards and elevated levels of light projected onto the display, adjusting the opacity of the media asset on the display. For example, when a user enters a shaded area and the light directed at the smart glasses lessens, the display may lessen the opacity to better provide entertainment to the user. On the other hand, when the user enters a very bright area and the light directed at the smart glasses increases, the display may increase the opacity. In some embodiments, the display on the smart glasses is opaque. In addition, systems and methods are provided to enable a user to conveniently obtain and watch additional media assets on the smart glass display.

In some aspects of the disclosure, the smart glass display generates an extended reality environment and receives input from one or more sensors. In some aspects of the disclosure, the smart glass display generates for display a media asset for entertainment and receives input from one or more sensors. Based on the received input, the system presents the media asset in a field of view at a first opacity level, and, in response to detecting a hazard, adjusts the display from the first opacity to a second opacity. For example, as a user watching a show on the display walks into a bright area with direct sunlight, the display is adjusted to counter the light shining on the smart glass display. In another example, if a user is be walking along a road and a light shines on the smart glasses, the combination of the bright light and being near a road (i.e., a hazard) causes the display to pause presentation of the media asset and lower the opacity to near zero to allow the user to focus on the surroundings. Thus, brightness and hazards can be monitored to overcome challenges associated with providing both high quality and safe entertainment to a user in a field of view of the user, which may improve the user experience with the smart glass system, particularly for a user exploring many different and unique environments.

The smart glass display may comprise a display that is inserted in the lens and may be in one of a foreground or a background in the field of view on the smart glass display, and the additional information may be in the other of the foreground or the background in the field of view in the extended reality environment. In some embodiments, the smart glass display may present a media asset that is overlaid on a transparent display area visible through the smart glass display. The transparency or luminosity, may be adjusted based on a variety of conditions, including brightness to enhance and change color mix.

In some embodiments, regenerating for display the first object with the modified level of detail comprises presenting the object in a higher resolution. Additionally, or alternatively, one or more actions may be performed on the smart glass display to control the actions, for example, using voice control or detected eyelid motions and/or eye pupil movements.

In some embodiments, detecting the eyelid motion comprises determining an amount of motion of the eyelid and/or one or more eyelid levels, as well as eye pupil movement and or eye pupil position. The system may detect that a user is navigating from a first position to a new position in the extended reality environment, while the first object remains in the field of view, and generate for display an updated version of the first object based on a perspective of the user at the new position.

In some aspects of the disclosure, a smart glass system generates for display a media asset, and stores in memory a table of eyelid motion and/or eye pupil movement identifiers and corresponding actions performable on the display. Using a sensor, the system detects an eyelid motion and matches the detected eyelid motion to one of the stored eyelid motion identifiers. In response to matching the detected eyelid motion to one of the stored eyelid motion identifiers, the system generates for display an updated version of the extended reality environment by performing the action that corresponds to the matched eyelid motion. In some embodiments, using a sensor, the system detects a gaze of a pupil (e.g., pupil indicated where the gaze is focused or directed) of the user and when the pupil motion away from the display, for example, to the side of the smart display for a period of time, the system matches the detected pupil motion to one of the stored pupil motion identifiers. In response to matching the detected pupil motion to one of the stored pupil motion identifiers, the system adjusts the presentation of the media asset for display after performing on the action that corresponds to the matched pupil motion. In some embodiments, the movement of the pupil away from the display for a period of time will cause the presentation to stop. In some embodiments, the system may generate for display a subset of the eyelid motion-identifier of actions performable on the object at which the gaze of the user is directed (e.g., to remind or guide the user as to an action that a certain eyelid motion causes to be performed). The action of the plurality of actions corresponds to manipulating the smart glass display. The system may detect that the user is navigating from a first position to a new position in the map along the path, while the gaze of the user remains on the display, and generate for display a media asset that is updated with warnings or indications of a hazard up ahead based on a perspective of the user at the new position.

In some embodiments, a user may be associated with a user profile specifying relationships between the smart glass display and corresponding actions performable on the display in the course of traveling. The actions performable on the display may vary based on the type of trip the user is taking (e.g., a walk, a run, a hike) and the hazards that the user may encounter.

In some aspects of the disclosure, the smart glass system generates for display a media asset and detects, using a first sensor, that a gaze has shifted from a first portion of the display to a second portion of the display (e.g., a menu with options for the user to select), where the selectable media asset is excluded from the first portion of the display and included in the second portion of the display. In response to detecting the gaze shift, the system generates for display within the display an indicator of the shift in the gaze, and detects, by using a second sensor, a voice command while the indicator is in a vicinity of the selectable media asset. In response to detecting the voice command, the smart glass system executes an action corresponding to the voice command. Thus, the smart glass system may be leveraged in combination with voice to improve the user experience. More specifically, a user may conveniently use his or her eyes to navigate a smart glass display (e.g., as a proxy for how a mouse or trackpad is used with a desktop, laptop or mobile device), receive real-time confirmation as to a location of his or her gaze, and perform desired actions in the display via voice command when an indicator of the gaze of the user is in the vicinity of a selectable media asset of interest in the smart glass display. In some embodiments, smart glass system may be leveraged in combination with voice to improve the user experience of watching a television. For example, the movements of the eye pupils may be used to navigate the screen while the movement of the eyelid may indicate selection of a selectable media asset.

An interactive media guide may be provided on the display, and the above-mentioned action may be an instruction related to a media asset accessible via the interactive media guide. The voice command may include an identification of the media asset and a command to execute the action, and/or an instruction to present a new media asset on the display and/or an instruction to retrieve content related to a media asset.

In some embodiments, the smart glass system may determine whether a rate of retinal movement exceeds a predetermined value, and in response to determining that the rate of retinal movement exceeds the predetermined value, normalize the retinal movement when translating the retinal movement into movement of the indicator on the display. The system may detect the voice command while the indicator is in the vicinity of the media asset (e.g., overlapping the lens) upon determining the gaze is directed at the display for at least a predetermined threshold period of time. The display is presented via a smart glass head-mounted device.

The smart glass system may generate for display within the media asset a plurality of opacity-based indicators in the vicinity of the first portion of the display, identify a boundary of the media asset, and vary the opacity of the at least one of the plurality of opacity-based indicators based on the identified boundary of the media asset. Thus, a user may conveniently use his or her eyes to navigate a smart glass display (e.g., as a proxy for how a mouse or trackpad is used with a desktop, laptop or mobile device) and receive real-time confirmation as to a location of his or her gaze, where the opacity of indicators of such real-time gaze is conveniently adjusted so as not to obscure the view of the user and degrade the user's experience.

The smart glass system may determine whether at least one of the opacity-based indicators overlaps the boundary of the object, and may vary respective degrees of opacity-based indicators/sensors that overlap the boundary. The plurality of opacity-based indicators are arrows directed towards the object. The smart glass system may detect, by using the sensor, whether the gaze has shifted to a second portion of the smart glass display, and in response to determining that the gaze has shifted to the second portion, cause the plurality of opacity-based indicators to be overlaid in a vicinity of the second portion of the display.

In some embodiments, the opacity of the respective indicators varies based on a distance from an object. This may act as an obstacle avoidance maneuver. For example, as the user is approaching an object, the opacity is adjusted to allow the user to see through the glass lens to avoid a collision with the object. For example, the respective opacities of the indicators may increase as the distance between the indicator and the object decreases (e.g., to emphasize the object the user is gazing at) or increase as the distance between the indicator and the object decreases (e.g., to avoid obscuring the object the user is gazing at).

In some embodiments, an interactive media guide may be provided on the display, and an action related to a selectable media asset accessible via the interactive media guide is received at least in part based on the detected gaze. Such display may be presented via a virtual reality head-mounted device or presented without the use of a virtual reality head-mounted device.

In some embodiments, the system may determine a new media asset is in the field of view for at least the predetermined time, and in response to such determination, generate for display on the smart glass display one or more selectable actions related to the new media asset, while continuing to generate for display on the smart glass display the one or more items related to the media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
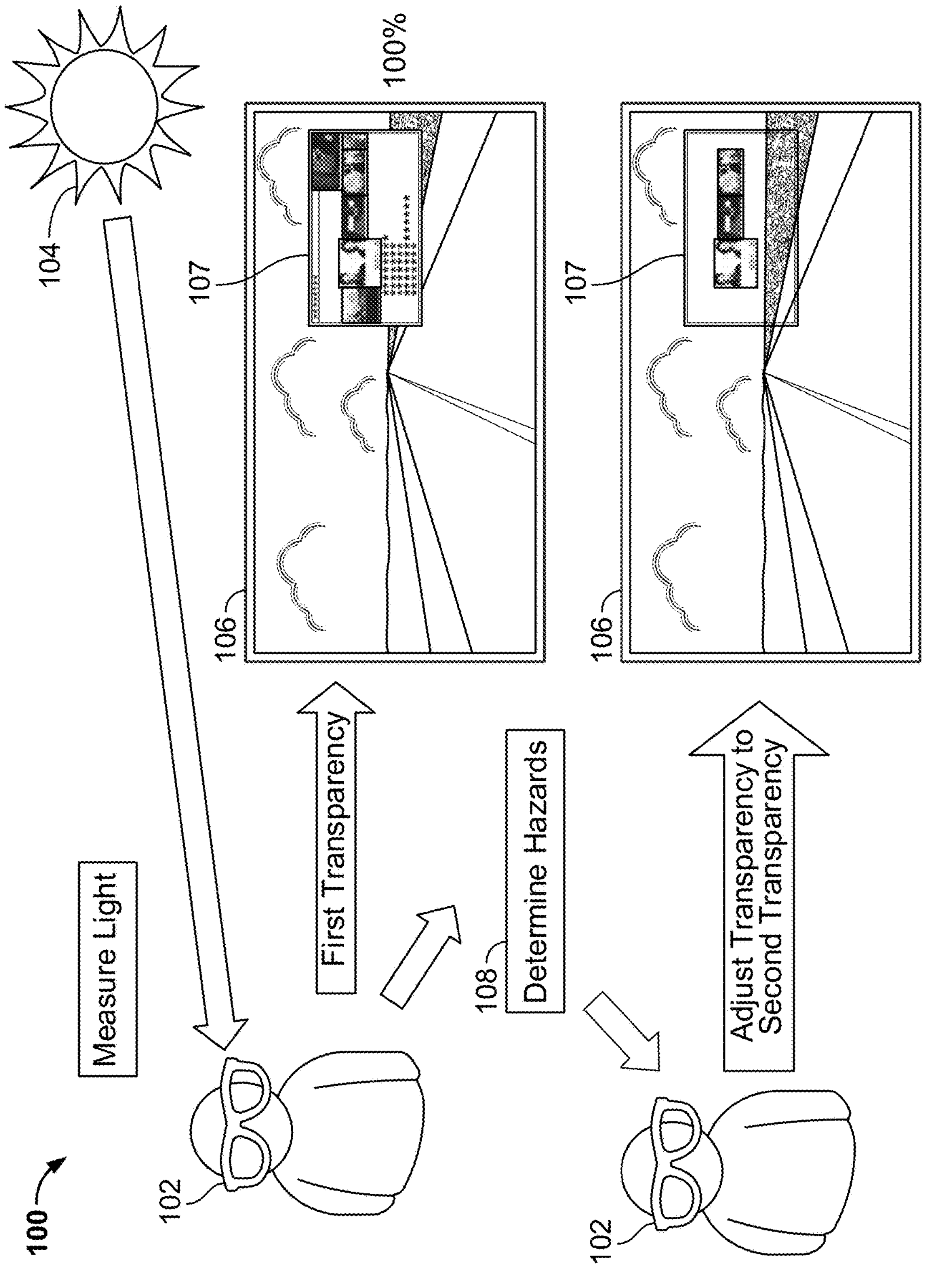
FIG. 1 shows an illustrative example of a smart glass display in a smart glass system projecting a media asset, in accordance with some embodiments of this disclosure.

FIG. 1 shows an illustrative example of a smart glass display in a smart glass system projecting a media asset, in accordance with some embodiments of this disclosure. Head-mounted display 102 may project images or videos as the user is moving about, from the display that may be positioned in one or both lenses. The display may project the images or video in the lens to generate a viewing environment 106 for immersing a user therein. Head-mounted display 102 may alternatively be a wearable device (e.g., smart glasses) to facilitate the generation of environment 106. Environment 106 may alternatively be a real-world view of the user with a display for the presentation of a media asset including an augmented reality (AR) environment. In some embodiments, a view or perspective of the user of environment 106 changes as the user moves their head, and other features (e.g., audio) are suitably modified, simulating the physical world. Display 107 may be for entertainment purposes (e.g., video games, movies, videos, sports, etc.), communication (e.g., social media), educational purposes (e.g., a virtual classroom), professional purposes (e.g., training simulations), medical purposes, etc.

The smart glass system may monitor the illuminance on the display along with hazards in a field of view of the user. A field of view is a portion of smart glass environment 106 including display 107 that is presented to the user at a given time. The field of view may comprise 3D or 2D images, which may include a mix of real objects and virtual objects overlaid on top of the real objects using the AR device (e.g., for smart glasses, a picture captured with a camera and content added by the smart glasses).

A smart glass system (e.g., system 400 of FIG. 4) may generate a data structure for the field of view, including object identifiers associated with virtual objects in the field of view, and such data structure may include coordinates representing the position of the field of view on the smart glass display. As shown in the example of FIG. 1, as a user is moving (e.g., walking, running, cycling, sitting in a vehicle) in the field of view of the user in environment 106 includes display 107, with options for the user to select the entertainment. Display 107 may be moved, enlarged, faded into the background. However, one of skill in the art will appreciate that any number or combination of different types of presentation of the display may be included in environment 106. The smart glass system may generate for presentation display 107 in a default level of detail (e.g., a default resolution or number of displayed pixels, or a default size or appearance). For example, objects in environment 107 may be presented by default in 4K resolution (3840×2160), or any other suitable resolution. A resolution of display in environment 106 may be the same, or vary, for each eye of the user. In some embodiments, the level of detail may refer to a size or appearance of the display, e.g., the display may be generated at a default size or default color.

In some embodiments, upon presenting a media asset in a display 107 in the field of view of the user, the smart glass system may generate for display identifiers (e.g., "Blink once to modify details of car"), which may indicate or otherwise provide guidance to the user as to how a particular eyelid and pupil motion causes certain actions to be performed on object 104. In some embodiments, the display may present display indicators and prompt the user to provide a voice command.

Once the display presents a media asset in the field of view, the smart glass system may measure light illuminance on the smart glass display by using a sensor (e.g., a camera). In some embodiments, the smart glass system may detect whether light illuminance exceeds a predetermined period of time (e.g., 0.5 seconds or 1 second) in order to avoid performing an action when momentary light increase is observed. In response to detecting the light illuminance 104 exceeding a threshold, the smart glass system may monitor for environmental conditions to determine if hazards 108 (e.g., an intersection, a stop sign, a traffic indication on a map, an emergency warning or a high-traffic road, a trail or road ground hazard) exist near the user and, when combined with the light illuminance, may pause presentation of the media asset provided to the user via head-mounted display 102. A ground hazard may be an obstacle, ground cover, e.g., snow, leaves or branches or a combination. In some embodiments, the system determines the ground hazard by monitoring the conditions on the ground. For example, the opacity of the display may be altered to permit the user a full field of view or focus rather than the initially provided opacity, for example, incrementally reducing the opacity. In some embodiments, the opacity may be incrementally reduced by ten percent (10%) over a short period (e.g., 1 second) to avoid drastic change. In some embodiments, to change the display, a voice command may be required or eyelid or pupil motion may cause the smart glass system to modify details of display 107 differently (e.g., increasing or decreasing the size of the display as compared to the initial presentation of the display).

In some embodiments, the smart glass system (e.g., system 400 of FIG. 4) may include head-mounted display 102 and may generate for display media asset 107 by way of head-mounted display 102. The system may detect, by using a sensor (e.g., a camera), that a gaze of the user is directed at a portion of the media asset (e.g., including display 107). The system may generate for display within media asset 107 a plurality of opacity-based indicators in the vicinity of the portion of display 107 of environment 106. For example, an indicator is shown as part of the interactive media display directed at the media asset of interest, although it will be appreciated by those of skill in the art that the indicator may comprise any suitable indicia or marking to cause the associated object to be emphasized or prominently displayed to the user. For example, the indicators may be a certain color or shape to highlight the media asset of interest, images or emojis of eyeballs, or magnification of the media asset in the vicinity of the indicators.

The system may identify boundary (e.g., edges, shape outline, border) of media asset 107, e.g., by edge detection techniques, retrieving coordinates of a media asset, analyzing pixel values of the area surrounding media asset, etc. Based on the object's identified boundary, the smart glass system may vary an opacity of at least one of the plurality of opacity-based indicators. In some embodiments, the system may determine whether at least one of the plurality of opacity-based indicators overlaps, or is within a predetermined distance of, the boundary of the media asset, and in response to such determination, may vary the respective opacities of the one or more indicators that overlap the boundary of media asset. For example, the system may compare coordinates of the media asset of interest in smart glass system 400 of FIG. 4 to coordinates of the indicators. In some embodiments, if the system detects that the gaze of the user shifts from a portion of the display (e.g., including the media asset) to a portion of the display including no media asset, the system causes the plurality of opacity-based indicators to be overlaid in a vicinity of the portion of the display including the media asset. The entire cluster of indicators may move to such new portion of the display.

The system may vary the respective opacities based on a distance of the gaze from the media asset. The respective opacities of indicators may increase as the distance between gaze and the media asset decreases. This may be desirable in order to emphasize to the user the portion of the display to which his or her gaze is directed. In another example, the respective opacities of indicators may decrease as the distance between the gaze and the media asset decreases. This may be desirable in order to minimize obscuring portions of the media asset of interest. In some embodiments, the system may determine whether any of the indicators overlap or are otherwise in a vicinity field of view that may not be of interest, and in such circumstance, the indicators may be set to be translucent to avoid obscuring portions of such media asset not of interest to the user.

The smart glass systems 100, 200, may include an interactive media guide. In response to receiving a voice command to perform an action associated with a media asset in the vicinity of indicators, the system may perform the action (e.g., cause for presentation media asset). The indicators may also be used in connection with other environments (e.g., video games, sports, communications, social media, etc.).

The smart glass systems 100, 200, may include an interactive media guide where the user may disable the automatic adjustment of transparency or pause the display in response to identifying hazards. In some embodiments, the user will be prompted with an indicator to accept the hazard and maintain the presentation of the media asset.

As another example, environment 106 may be a mountain range, and upon determining, based on detected eye motion (e.g., detected via a sensor) of the user, that a media asset (e.g., a mountain) is in the field of view of the user for at least a predetermined period of time, information concerning the mountain object may be generated for display to the user (e.g., the name of the mountain, the elevation of the mountain, the location of the mountain, a list of movie posters where the mountain is mentioned in the movie or its metadata, etc.). In another example, upon determining, based on detected eye motion (e.g., detected via a sensor) of the user, that a media asset (e.g., a mountain) is in the field of view of the user, and that the user has moved his or her gaze away from the media asset, the system may pause the presentation of the media asset. In some embodiments, the media display in the foreground may be faded so that the background becomes visible.

In certain embodiments, additional input (e.g., voice commands, hand gestures, touch) may be utilized in combination with detecting the eye motion of the user. For example, the system may receive a voice command indicating that the user no longer wishes to view additional information related to the media asset of interest, or may receive a voice command to display additional information, and may retrieve additional information related to the media asset of interest from an item information database or the internet 410.

Figure 2:
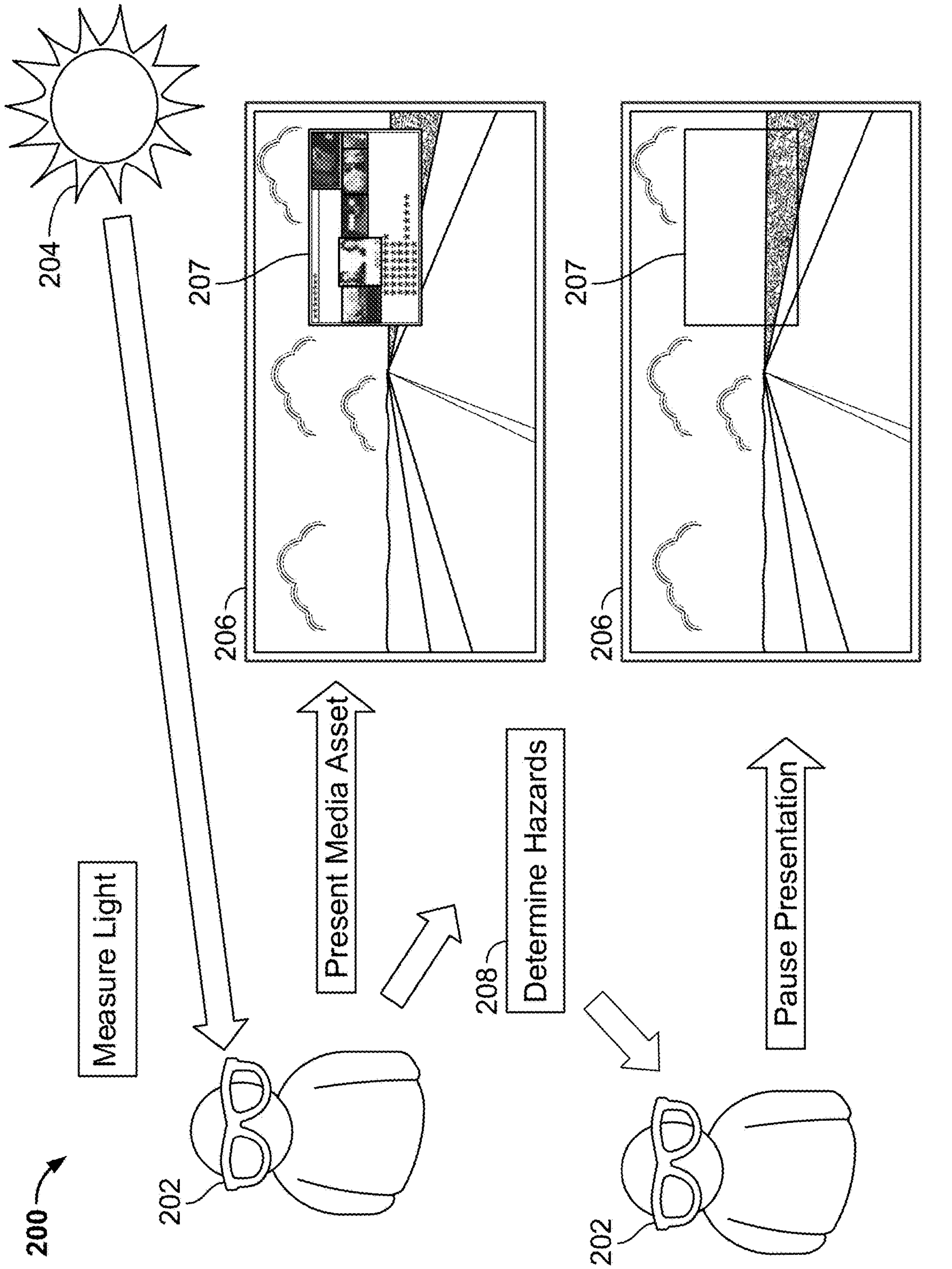
FIG. 2 shows another illustrative example of a smart glass display in a smart glass system projecting a media asset, in accordance with some embodiments of this disclosure.

FIG. 2 shows an illustrative example of a smart glass display in a smart glass system projecting a media asset, in accordance with some embodiments of this disclosure. The smart glass system 200 includes a head-mounted display 202 that may project images or videos as the user moves about, from the display 207 which may be positioned in one or both lenses. The display may project the images or video in the lens to generate a viewing environment 206 for immersing a user therein. Head-mounted display 202 may alternatively be a wearable device (e.g., smart glasses), to facilitate the generation of environment 206. Environment 206 may alternatively be a real-world view of the user with a display for a presentation of media assets including an augmented reality (AR) environment. In some embodiments, a view or perspective of the user of environment 106 changes as the user moves his or her head, and other features (e.g., audio) are suitably modified, simulating the physical world. Display 207 may be for entertainment purposes (e.g., video games, movies, videos, sports, etc.), communication (e.g., social media), educational purposes (e.g., a virtual classroom), professional purposes (e.g., training simulations), medical purposes, etc.

The smart glass system may monitor the illuminance on the display along with hazards in a field of view of the user. A field of view is a portion of smart glass environment 206 including display 207 that is presented to the user at a given time. A smart glass system (e.g., system 400 of FIG. 4) may generate a data structure for the field of view, including object identifiers associated with the media asset in the field of view, and such data structure may include coordinates representing the position of the field of view on the smart glass display. As shown in the example of FIG. 1, as a user is moving (e.g., walking, running, cycling, sitting in a vehicle), the field of view of the user in environment 106 includes display 107, with options for the user to select the entertainment. The smart glass system 200 may generate for presentation display 207 in a default level of detail (e.g., a default resolution or number of displayed pixels, or a default size or appearance). For example, objects in environment 107 may be presented by default in 4K resolution (3840×2160) or any other suitable resolution. A resolution of display in environment 206 may be the same, or vary, for each eye of the user. In some embodiments, the level of detail may refer to the display's size or appearance, e.g., the display may be generated at a default size or default color.

In some embodiments, upon presenting a media asset in a display 207 in the field of view of the user, the smart glass system may monitor the environment of the user for hazards and the user's relative movement to cause certain actions to be performed on media asset 20. In some embodiments, the display may present display indicators, and prompt the user to provide a voice command.

Once the display presents a media asset in the field of view, the smart glass system may monitor for hazards and measure light illuminance on the smart glass display by using a sensor (e.g., a camera). In some embodiments, the smart glass system may detect whether light illuminance exceeds a predetermined period of time (e.g., 0.5 seconds or 1 second) in order to avoid performing an action when a momentary light increase is observed. In response to detecting the light illuminance 204 exceeding a threshold, the smart glass system may monitor for environmental conditions to determine if a hazard 208 (e.g., an intersection, a stop sign, a traffic indication on a map, an emergency warning or a high-traffic road, or a trail hazard) exist near the user and when combined with the light illuminance, may pause presentation of the media asset provided to the user via head-mounted display 202 and further remove the display from the field of view of the user to allow the user an unimpeded view. For example, the opacity of the display may be altered to permit the user a fuller field of view or focus than the initially provided opacity; for example, the opacity may be reduced to zero, i.e., the display may be made transparent. In some embodiments, the opacity may be incrementally reduced by ten percent (10%) over a short period (e.g., 1 second) to avoid drastic change.

In some embodiments, the system includes an electronic voice recognition (or voice-assisted) device (e.g., a television, a computer, a voice assistant) responsive to user voice commands, and the voice input may be in the form of audio or digital signals (or audio or digital input). The system may perform natural language understanding (NLU) techniques, and may include natural language understanding circuitry and/or speech-to-text circuitry to transcribe the voice command to text, and may parse the voice command to identify and extract keywords from the voice input. The system may compare the extracted keyword to metadata associated with an object of interest to determine whether there is a match, e.g., whether to execute the voice command. In some embodiments, if the received voice command does not match the object in the vicinity of the indicator, the system may notify the user of the mismatch and refrain from executing the associated action, or prompt the user for a new voice command.

In some embodiments, the voice command includes an identification of the media asset and a command to execute the action (e.g., play, fast-forward, rewind, etc.), or an instruction to present a new media asset on the display (e.g., to scroll through other media assets or move to a new page of media assets in a carousel).

Figure 3:
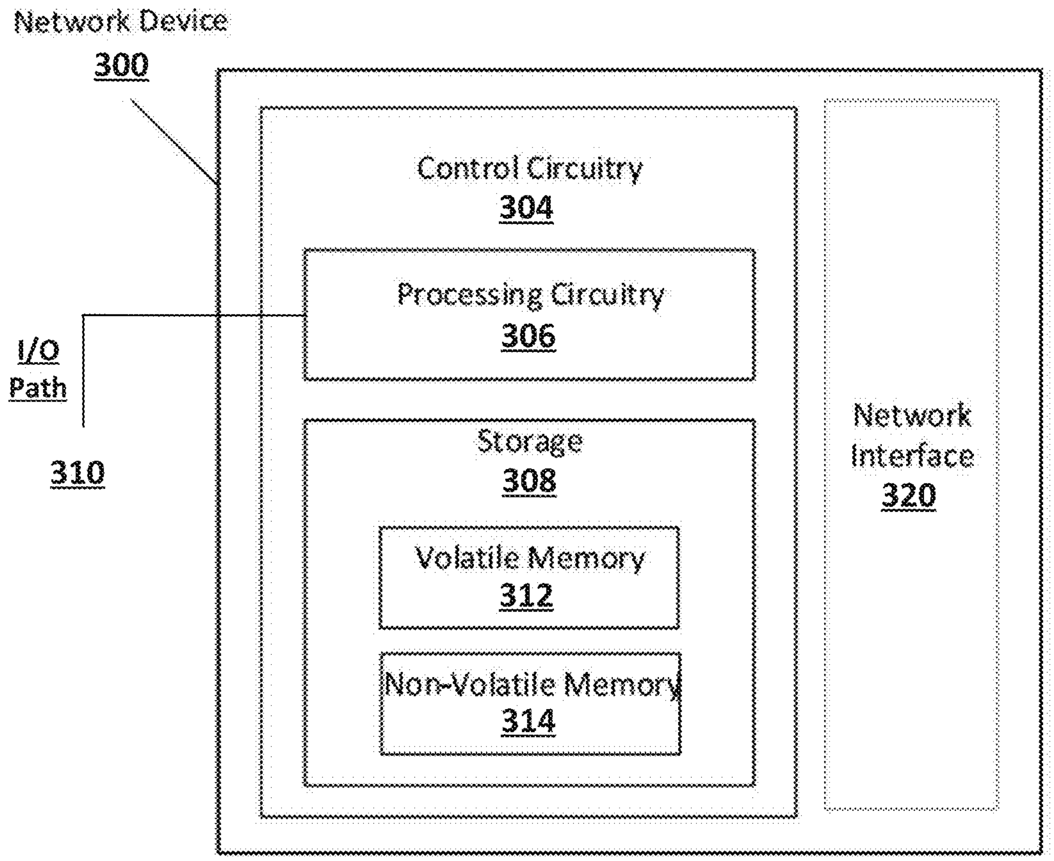
FIG. 3 is a block diagram of an illustrative device in a smart glass system, in accordance with some embodiments of this disclosure.

FIG. 3 is a block diagram of an illustrative device in a smart glass system, in accordance with some embodiments of this disclosure. Device 300 in a smart glass system may include one or more servers to generate, display, and/or manage a smart glass display, transmitted over a computer network to a smart glass display (e.g., devices 102, 202 of FIGS. 1-2, respectively). The device 300 may include control circuitry 304 and an I/O path 310. Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, hexa-core, or any suitable number of cores) or supercomputer.

In some embodiments, processing circuitry 306 may be distributed across multiple separate processors or processing units, for example, multiple of the same type of processing units (e.g., two Intel Core i7 processors) or multiple different processors (e.g., an Intel Core i5 processor and an Intel Core i7 processor). I/O path 310 may provide device information, or other data, over a local area network (LAN) or wide area network (WAN), and/or other content and data to control circuitry 304, which includes processing circuitry 306 and storage 308. Control circuitry 304 may be used to send and receive commands, requests, signals (digital and analog), and other suitable data using I/O path 310. I/O path 310 may connect control circuitry 304 (and specifically processing circuitry 306) to one or more communications paths.

In some embodiments, control circuitry 304 executes instructions for execution of smart glass content generation and/or processing functions stored in memory (e.g., storage 308). The instructions may be stored in either a non-volatile memory 314 and/or a volatile memory 312 and loaded into processing circuitry 306 at the time of execution. A system for generating and processing smart glass content (e.g., the systems described in reference to FIGS. 1-2) may be a stand-alone application implemented on a user device (e.g., end-user device 420) and/or a server (e.g., server 400) or distributed across multiple devices in accordance with device 300. The system may be implemented as software or a set of executable instructions. The instructions for performing any of the embodiments discussed herein of smart glass processing may be encoded on non-transitory computer-readable media (e.g., a hard drive, random-access memory on a DRAM integrated circuit, read-only memory on a BLURAY disk, etc.) or transitory computer-readable media (e.g., propagating signals carrying data and/or instructions). For example, instructions in accordance with the processes described herein may be stored in storage 308 and executed by control circuitry 304 of device 300.

Control circuitry 304 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and down converting content into the preferred output format of the end-user devices 420, 425, 430 of FIG. 4. Circuitry 304 may also include digital-to-analog converter circuitry and analog-to-digital converter circuitry for converting between digital and analog signals. The tuning and encoding circuitry may be used to receive and to display, to play, or to record content. The tuning and encoding circuitry may also be used to receive guidance data. The circuitry described herein, including, for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, functions for incorporating video or other recordings of physical environments, multiple-tuner recording, etc.). If storage 308 is provided as a separate device from device 300, the tuning and encoding circuitry (including multiple tuners) may be associated with storage 308. Device 300 may be a central device in communication with each device (e.g., 102, 202). Alternatively, device 300 may correspond to device 104, that is, each system (e.g., of FIGS. 1-2) may not have its own device 420, but rather a single central device 400 may carry out smart glass environment generation and processes for each system.

Figure 4:
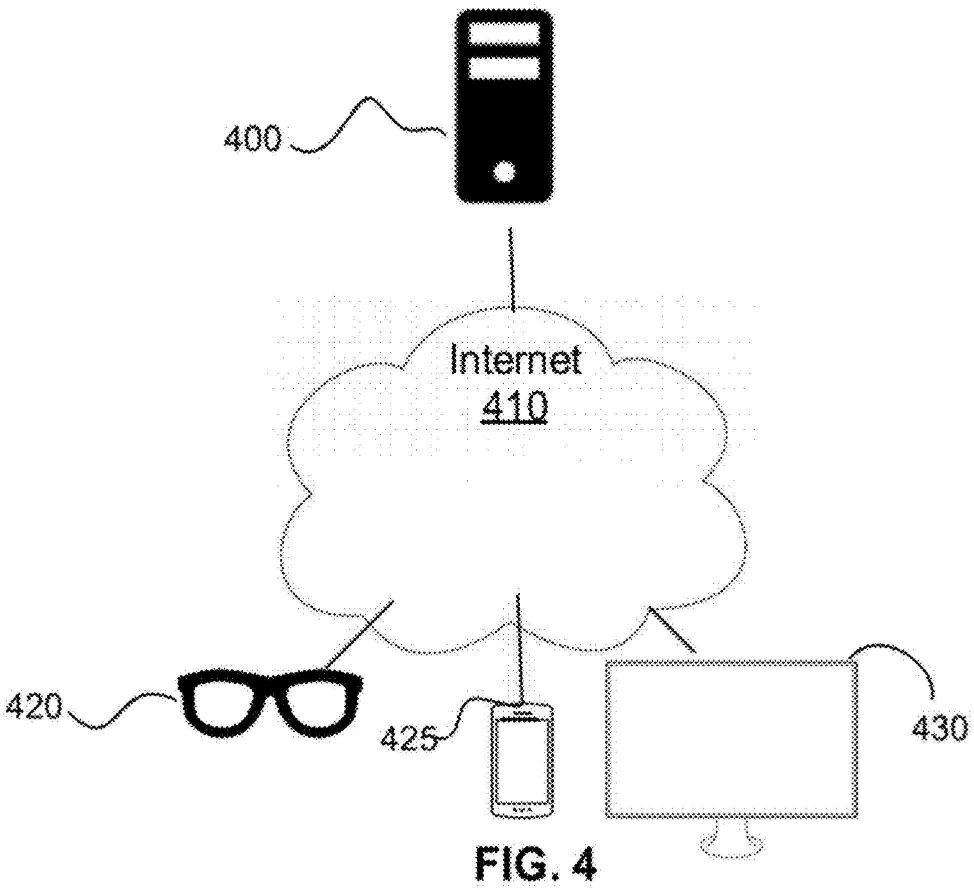
FIG. 4 is a block diagram of an illustrative smart glass system, in accordance with some embodiments of this disclosure.

FIG. 4 shows an illustrative block diagram of a smart glass content system according to some embodiments of the disclosure. At least one smart glass content server 400 generates smart glass content, such as that described herein. Smart glass content server 400 may transmit the content over internet 410 to multiple end-user devices including devices 420, 425, 430. End-user smart glass devices may include, for example, personal computers, mobile devices (e.g., smartphones), and/or wearable devices including smart glass headsets, goggles, suits, gloves, etc., configured to present and allow interaction with a smart glass display. These devices are configured to allow an operator/user to view and interact with multi-user smart glass content (e.g., via a display screen). These devices may provide, for example, visual, audio, and haptic feedback that presents the perspectives and attention-directing cues, such as described herein. End-user devices 420, 425, 430 also transmit data to server 400 via internet 410, where such data includes orientation information indicating the direction the devices 420, 425, 430 are facing (and thus the view that server 400 must generate for display on each device 420, 425, 430); audio signals detected by each device 420, 425, 430; and user input. Server 400 may then generate a view of the smart glass environment for each device 420, 425, 430. The display screen may generally comprise a display screen of one or more of the devices worn by the user including, but not limited to, a display screen of the portable radio, the display screen of the video capture device, a display screen of the laptop, a display screen of the smart glasses, and the like.

Figure 5:
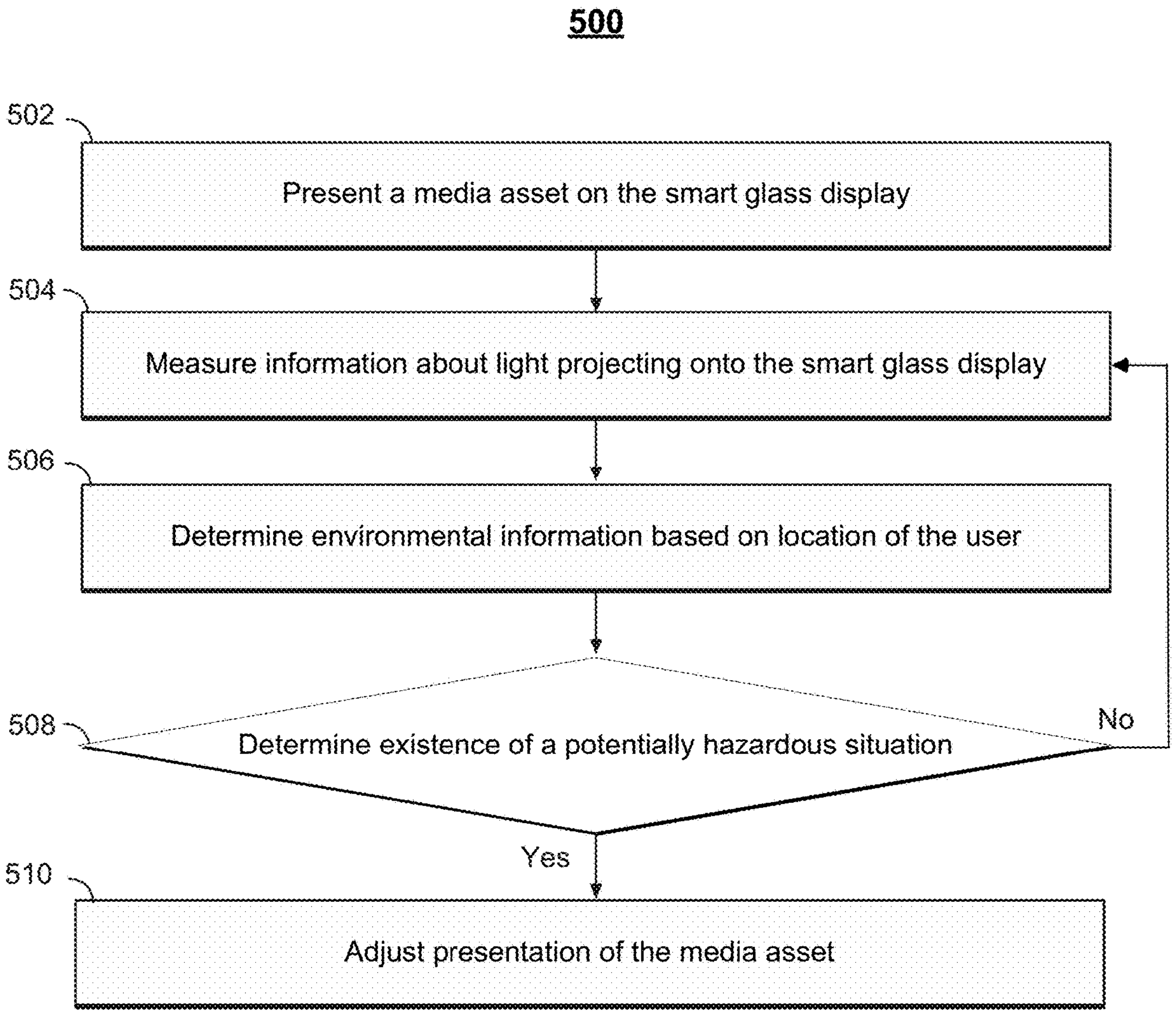
FIG. 5 is a flowchart of a detailed illustrative process for controlling a smart glass display, in accordance with some embodiments of this disclosure.

FIG. 5 is a flowchart of a detailed illustrative process for controlling a smart glass display, in accordance with some embodiments of this disclosure. It should be noted that process 500 or any step thereof could be performed on, or provided by, any of the devices shown in FIGS. 3-4. For example, process 500 may be executed by network device 300 (e.g., via control circuitry 304), and/or control circuitry of the server 400, and/or control circuitry of device 420, 425, 430, as instructed by one or more programs of computer-executable instructions that may be implemented on network device 300, and/or server 400, and/or device 420, 425, 430, such as to distribute control of the smart glass system among multiple devices. In addition, one or more steps of process 500 may be incorporated into or combined with one or more steps of any other process or embodiment (e.g., process 600 of FIG. 6).

At 502, input/output (I/O) circuitry (e.g., I/O circuitry of head-mounted display 102) may receive a presentation of a media asset on a smart glass display at a first transparency and/or luminosity. Such a first transparency may be determined based on environmental conditions around the smart glass display. In some examples, under bright conditions, the first transparency may be almost or near opaque with no transparency. In some embodiments, the transparency is selected by the user. Such user selection may be received via input (e.g., voice command or touchscreen. In some embodiments, the user selection may be communicatively connected with handheld device or a smartwatch).

At 504, control circuitry (e.g., control circuitry 304 of FIG. 3 and/or control circuitry of head-mounted display 102 of FIG. 1) may, in response to causing presentation of a media asset, measure information about light projection onto the smart glass display (e.g., via head-mounted device 102 of FIG. 1).

At 506, I/O circuitry (e.g., I/O circuitry of head-mounted display 102) may determine environmental information based on the location of the user. For example, the system may determine the location of the user and destination, and based on this, a route may be identified, as well as hazards along the route. Hazards may include traffic, being close to an edge on a cliff, intersection, or any other unsafe conditions. In some embodiments, environmental information may include the geographical location of the smart glasses, weather conditions, and sunlight conditions, for example, if the weather conditions indicate inclement weather, for example, rain, snow, cloudy, overcast. The sunlight conditions may include the time of day and where the sun is directly pointing at the smart glasses or whether it is later in the day and the sunlight is not as strong. In some embodiments, when the user is walking in the direction of the sun, for example, walking east in the mornings and walking west in the evenings, the user may be hit with direct sunlight, which may cause a hazard. In such an aspect, the system monitors the sunlight and adjusts the display based on the sunlight. In some embodiments, the smart glass display reduces the opacity, color mix or luminosity when walking in the sun's direction and when walking in another direction increasing the opacity, color mix or luminosity.

At 508, the control circuitry (e.g., control circuitry 304 of FIG. 3 and/or control circuitry of head-mounted display 102 of FIG. 1) may determine whether there exist a potentially hazardous situation in a field of view of the user, based on the received input. If a potentially hazardous situation is identified in the field of view of the user ("Yes" at 508), then, the system proceeds to 510 to adjust the presentation of the media asset. If no potentially hazardous situation is identified in the field of view of the user ("No" at 508), then the system repeats 504. In some embodiments, the control circuitry may generate a data structure for the field of view, including hazard identifiers associated with hazards in the field of view, and such data structure may include coordinates representing the position of the field of view on the smart glass display. The control circuitry may determine the present field of view based on the data structure and/or images captured by the smart glass device 102, and identify hazards in the field of view of the user.

At 510, the control circuitry may adjust presentation of the media asset based on the determining the existence of a potentially hazardous situation. For example, the system may adjust the transmittance of the display on the smart glass display to counter the light and identified hazard.

Figure 6:
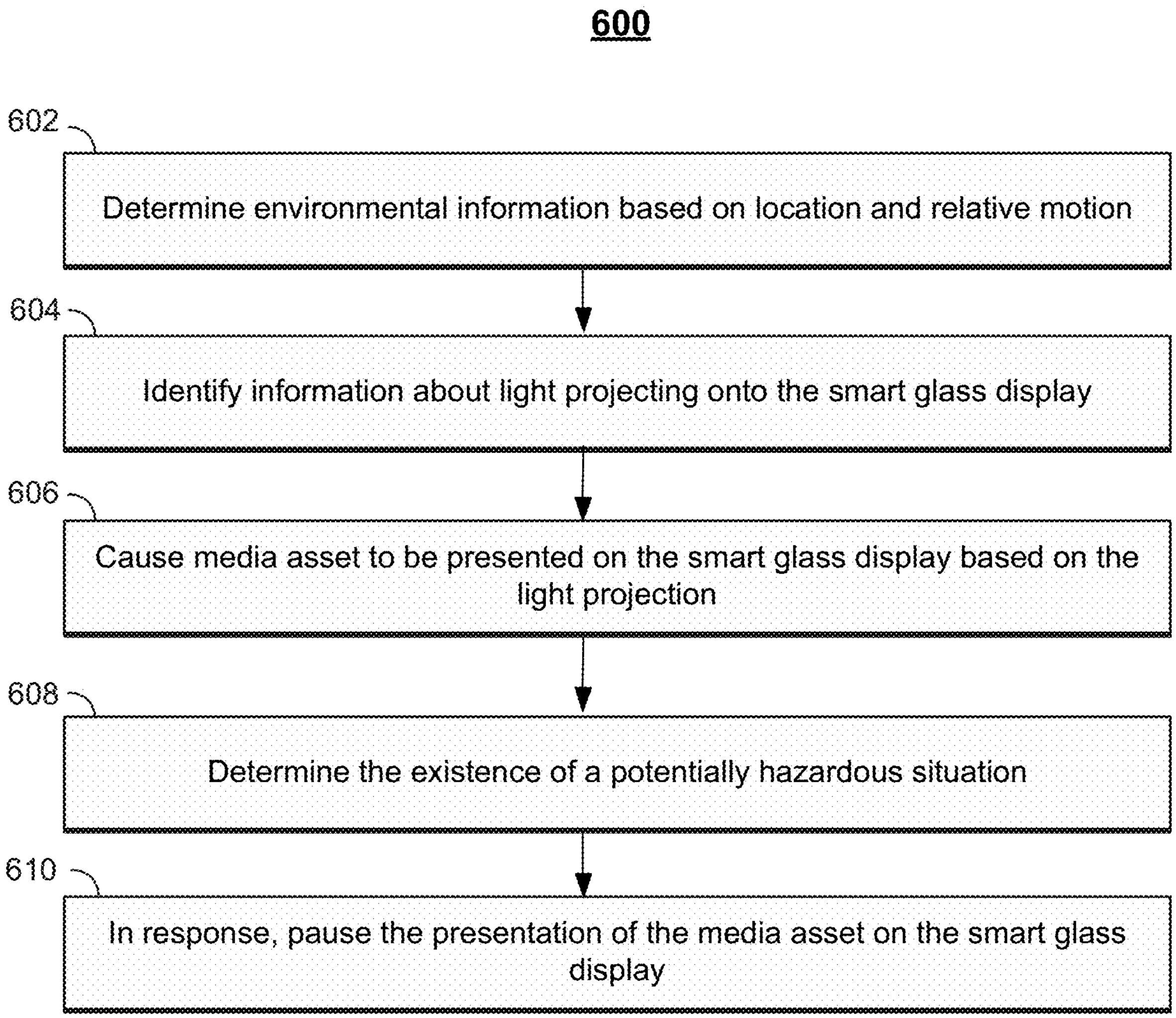
FIG. 6 is a flowchart of a detailed illustrative process for controlling a smart glass display, in accordance with some embodiments of this disclosure.

FIG. 6 is a flowchart of a detailed illustrative process for controlling a smart glass display, in accordance with some embodiments of this disclosure. For example, process 600 may be executed by network device 300 (e.g., via control circuitry 304), and/or control circuitry of the server 400, and/or control circuitry of device 420, 425, 430, as instructed by one or more programs of computer-executable instructions that may be implemented on network device 300, and/or server 400, and/or device 420, 425, 430, such as to distribute control of the smart glass system among multiple devices. In addition, one or more steps of process 600 may be incorporated into or combined with one or more steps of any other process or embodiment (e.g., process 500 of FIG. 4).

At 602, I/O circuitry (e.g., I/O circuitry of head-mounted display 202) may determine environmental information based on location and relative motion of the smart glasses. Such determining may include weather conditions, time of day and light conditions based on the location of the smart glass system.

At 604, control circuitry (e.g., control circuitry 304 of FIG. 3 and/or control circuitry of head-mounted display 202 of FIG. 2) may identify information about light projecting onto the smart glass display (e.g., via head-mounted device 202 of FIG. 2). The smart glass display may include a sensor that measures illuminance i.e., the amount of light (lumens) falling on a surface (over any given square foot or square meter). Measuring the amount of light that falls on a surface of the glasses allows the smart glass system to evaluate if there is sufficient light to perform various visual tasks or if the light is too strong.

At 606, I/O circuitry (e.g., I/O circuitry of head-mounted display 102) may cause the media asset to be presented on the smart glass display based on the light projection onto a sensor (e.g., a camera). The sensor may detect various attributes of the light illuminant including the light emitting from the display of the smart glass display. For example, the smart glass display receives a light illuminance from the environment as well as the light that is projecting from the display. The system may balance the total light, in case the sun is projecting onto the smart glass system, by adjusting light from the display, thereby reducing the illuminance from the display.

At 608, the control circuitry (e.g., control circuitry 304 of FIG. 3 and/or control circuitry of head-mounted display 202 of FIG. 1) may determine the existence of a potentially hazardous situation. For example, a hazardous situation such as an intersection, a traffic indication on a map, an emergency warning or a high-traffic road may be identified, and a data structure of the device may be identified based on the field of view. Such data structure may include coordinates representing the position of the field of view along the path of travel for the user. The control circuitry may determine the present field of view based on the data structure and/or images captured by the smart glass system 202.

At 610, the control circuitry, in response to identifying potentially hazardous situation, may pause the presentation of the media asset on the smart glass display. The pausing of the presentation may be done without user input. In some embodiments, the system may prompt the user with an option to pause the display. In some embodiments, an eyelid motion or pupil movement may be distinguished from involuntary blinks, and used to provide commands to the system.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for controlling an extended reality display, comprising:

causing presentation of a media asset in a first portion of the extended reality display, wherein the presentation of the media asset comprises a plurality of opacity-based indicators associated with a gaze of a user;

determining that a potentially hazardous situation is forthcoming based at least in part on a relative movement of the user;

based at least in part on the determining, detecting, via an extended reality device associated with the extended reality display, that the potentially hazardous situation exists in a field of view of the user while the media asset is being presented in the first portion of the extended reality display; and based at least in part on detecting that the potentially hazardous situation exists in the field of view of the user while the media asset is being presented in the first portion of the extended reality display, modifying the presentation of the media asset on the extended reality display, wherein the modifying is performed based at least in part on the relative movement of the user, and wherein the modifying comprises decreasing an opacity of the plurality of opacity-based indicators as a distance between the user and the potentially hazardous situation decreases.

2. The method of claim 1, wherein modifying the presentation of the media asset on the extended reality display comprises generating for display overlay information relating to the potentially hazardous situation, on the extended reality display, based at least in part on the relative movement of the user, and wherein the overlay information is an indication of the potentially hazardous situation.

3. The method of claim 1, wherein modifying the presentation of the media asset on the extended reality display comprises generating for display overlay information relating to the potentially hazardous situation, on the extended reality display, based at least in part on the relative movement of the user, and wherein the overlay information is a warning that the potentially hazardous situation is forthcoming.

4. The method of claim 1, wherein modifying the presentation of the media asset on the extended reality display comprises generating for display overlay information relating to the potentially hazardous situation, on the extended reality display, based at least in part on the relative movement of the user, and wherein the overlay information is environmental information based at least in part on a location of the user.

5. The method of claim 4, wherein the environmental information comprises one or more of a geographical location of the extended reality display, weather conditions, and sunlight conditions.

6. The method of claim 1, wherein modifying the presentation of the media asset on the extended reality display comprises causing the presentation of the media asset to be shifted to a second portion of the extended reality display based at least in part on the relative movement of the user, and wherein the second portion of the extended reality display does not obstruct visibility of the potentially hazardous situation via the extended reality device associated with the extended reality display.

7. The method of claim 1, wherein the potentially hazardous situation comprises one or more of: an intersection, a stop sign, a traffic indication on a map, an emergency warning, a high-traffic road or a ground hazard in a path of travel in which the user is moving.

8. The method of claim 1, further comprising determining the potentially hazardous situation based at least in part on a geographic location of the user and a relative motion of the user.

9. The method of claim 1, wherein the user is associated with a user profile specifying relationships between the extended reality display and corresponding actions performable on the extended reality display in the course of traveling.

10. The method of claim 1, wherein modifying the presentation of the media asset on the extended reality display comprises performing at least one of: causing the presentation of the media asset to be shifted to a second portion of the extended reality display based at least in part on the relative movement of the user, and generating for display overlay information relating to the potentially hazardous situation, on the extended reality display, based at least in part on the relative movement of the user.

11. A system for controlling an extended reality display, comprising:

a control circuitry; and an input/output (I/O) circuitry configured to:

cause presentation of a media asset in a first portion of the extended reality display, wherein the presentation of the media asset comprises a plurality of opacity-based indicators associated with a gaze of a user;

wherein the control circuitry is configured to:

determine that a potentially hazardous situation is forthcoming based at least in part on a relative movement of the user;

based at least in part on the determining, detect, via an extended reality device associated with the extended reality display, that the potentially hazardous situation exists in a field of view of the user while the media asset is being presented in the first portion of the extended reality display; and based at least in part on detecting that the potentially hazardous situation exists in the field of view of the user while the media asset is being presented in the first portion of the extended reality display, modify the presentation of the media asset on the extended reality display, wherein the modifying is performed based at least in part on the relative movement of the user, and wherein the modifying comprises decreasing an opacity of the plurality of opacity-based indicators as a distance between the user and the potentially hazardous situation decreases.

12. The system of claim 11, wherein the control circuitry is configured to modify the presentation of the media asset on the extended reality display by generating for display overlay information relating to the potentially hazardous situation, on the extended reality display, based at least in part on the relative movement of the user, and wherein the overlay information is an indication of the potentially hazardous situation.

13. The system of claim 11, wherein the control circuitry is configured to modify the presentation of the media asset on the extended reality display by generating for display overlay information relating to the potentially hazardous situation, on the extended reality display, based at least in part on the relative movement of the user, and wherein the overlay information is a warning that the potentially hazardous situation is forthcoming.

14. The system of claim 11, wherein the control circuitry is configured to modify the presentation of the media asset on the extended reality display by generating for display overlay information relating to the potentially hazardous situation, on the extended reality display, based at least in part on the relative movement of the user, and wherein the overlay information is environmental information based at least in part on a location of the user.

15. The system of claim 14, wherein the environmental information comprises one or more of a geographical location of the extended reality display, weather conditions, and sunlight conditions.

16. The system of claim 11, wherein the control circuitry is configured to modify the presentation of the media asset on the extended reality display by causing the presentation of the media asset to be shifted to a second portion of the extended reality display based at least in part on the relative movement of the user, and wherein the second portion of the extended reality display does not obstruct visibility of the potentially hazardous situation via the extended reality device associated with the extended reality display.

17. The system of claim 11, wherein the potentially hazardous situation comprises one or more of: an intersection, a stop sign, a traffic indication on a map, an emergency warning, a high-traffic road or a ground hazard in a path of travel in which the user is moving.

18. The system of claim 11, wherein the control circuitry is further configured to determine the potentially hazardous situation based at least in part on a geographic location of the user and a relative motion of the user.

19. The system of claim 11, wherein the user is associated with a user profile specifying relationships between the extended reality display and corresponding actions performable on the extended reality display in the course of traveling.

20. The system of claim 11, wherein the control circuitry is configured to modify the presentation of the media asset on the extended reality display by performing at least one of: causing the presentation of the media asset to be shifted to a second portion of the extended reality display based at least in part on the relative movement of the user, and generating for display overlay information relating to the potentially hazardous situation, on the extended reality display, based at least in part on the relative movement of the user.

* * * * *